(12) United States Patent
Fernandez Paez

(10) Patent No.: US 6,516,711 B1
(45) Date of Patent: Feb. 11, 2003

(54) SEMIAUTOMATIC DEEP FRIER WITH FUME AND SMELL PURIFIERS

(75) Inventor: Javier Fernandez Paez, San Fernando de Henares (ES)

(73) Assignee: Patatas Chef, S.L., Madrid (ES)

(*) Notice: Subject to any disclaimer, the term of this patent is extended or adjusted under 35 U.S.C. 154(b) by 0 days.

(21) Appl. No.: 09/869,684

(22) PCT Filed: Oct. 29, 1999

(86) PCT No.: PCT/ES00/00413

§ 371 (c)(1),
(2), (4) Date: Jun. 29, 2001

(87) PCT Pub. No.: WO01/30219

PCT Pub. Date: May 3, 2001

(51) Int. Cl.[7] ............................ A47J 37/12; A47J 36/38
(52) U.S. Cl. ................ 99/403; 99/408; 55/DIG. 36; 126/299 D
(58) Field of Search .................. 99/330–333, 352–355, 99/403–408, 409, 357, 334; 126/299 D, 299 R, 300, 299 E, 299 F; 55/DIG. 36, 446, 485, 316, 467, 387, 429, 338, 444, 385.1, 328, 385.2; 261/94; 177/71; 96/229, 58, 142, 220; 221/150 A

(56) References Cited

U.S. PATENT DOCUMENTS

| | | | |
|---|---|---|---|
| 3,357,341 A | * | 12/1967 | Kocken et al. ............... 99/334 |
| 3,496,957 A | * | 2/1970 | Gibellina ................... 55/446 X |
| 3,690,247 A | * | 9/1972 | Van Cleven et al. .......... 99/355 |
| 4,900,341 A | * | 2/1990 | Csabai ........................ 55/222 |
| 4,945,826 A | * | 8/1990 | Ripatonda ................. 99/407 X |
| 4,971,223 A | * | 11/1990 | Falavigna ................. 99/355 X |
| 5,003,868 A | * | 4/1991 | Higgins et al. ............... 99/357 |
| 5,029,520 A | * | 7/1991 | Okada .......................... 99/357 |
| 5,133,786 A | * | 7/1992 | Anderson ................. 55/485 X |
| 5,454,296 A | * | 10/1995 | Beardsley et al. ............ 99/403 |

FOREIGN PATENT DOCUMENTS

| | | | |
|---|---|---|---|
| EP | 0 234 996 | * | 9/1987 |
| EP | 0 298 000 | * | 1/1989 |
| EP | 2 098 932 | * | 5/1997 |
| EP | 0 885 583 | * | 12/1998 |
| ES | 2098932 | | 5/1997 |
| FR | 2 661 085 | * | 10/1991 |
| FR | 2750847 | * | 1/1998 |
| WO | 95 14417 | * | 6/1995 |

\* cited by examiner

Primary Examiner—Timothy F. Simone

(57) ABSTRACT

A semiautomatic deep frier which provides for the purification of the fumes and odors of the frying vapors prior to the expulsion thereof to the exterior, having in addition to the elements necessary for frying, a condenser inside which is a stainless steel coil and is connected to a collector that collects water and frying oils and is itself connected to a residual liquid outlet pipe that terminates into a tank. Dry air from the condenser goes through carbon filters prior to their expulsion to the outside through the grilles.

1 Claim, 3 Drawing Sheets

SEMIAUTOMATIC DEEP FRIER WITH FUME AND SMELL PURIFIERS

OBJECT OF THE INVENTION

The present invention relates to a semiautomatic deep frier with fume and smell purifiers, that is as its name suggests a deep frier with all tasks semi-automated, and in which prior to extraction of the frying fumes a fume and smell purification takes place.

Thus, the present invention can be circumscribed to the field of deep friers in which certain frying functions may be programmed.

BACKGROUND OF THE INVENTION

As of this moment the applicant is unaware of a semiautomatic deep friers in which a fume and odour purification takes place prior to extraction of the fumes resulting from flying.

However, we must mention Spanish patent titled Potato Chip Dispenser with publication number ES 2107367, in which the potato, once peeled, cut and refrigerated is fed by means of a worm gear to a moving trolley placed on an adjustable counterweight balance, passing onto a deep frier with one or two consecutive doses, and falling onto a tray separated by a double worm gear with conical ends in which once the potato is fried it is salted and the desired sauces are added. The frier basically comprises a scoop, a blade driving motor, and a tank. With this patent we wish to point out that the means provided for the action of frying are already known. However, in all deep friers present in the market the fumes are extracted directly to the exterior or are previously passed through a filter. Extraction of frying fumes implies a number of disadvantages, such as requiring a smoke extraction system for the site, with the ensuing pipes leading to the top of the building to prevent problems with neighbours, in addition to the odours and grease which are naturally left in the surroundings.

Therefore, the object of the present invention is to solve the aforementioned disadvantages and to provide deep friers already present in the market with the means required to purify fumes and odours resulting from frying, prior to their extraction to the outside.

DESCRIPTION OF THE INVENTION

The invention disclosed for a semiautomatic deep frier with purification of fumes and odours consists of a deep frier which allows to fry any frozen or fresh food not larger than a given size, in which said frier basically comprises an external structure in which the frier itself is housed, as well as other elements required for frying, such as the electrical board or programming panel from which the various programs are accessed and modified, where modification entails altering the frying time of each program. In addition there is the fume condenser, the filter box for the previously condensed fumes, the collector, the residue caisson, etc.

The deep frier elements required to obtain the object of the present invention for a semiautomatic deep frier with fume and smell purifiers are the condenser and the filter box. The condenser is a prism shaped elements inside which is a stainless steel coil through which flow all vapours generated during frying, causing their condensation. After these fume s are condensed water and oil a re generated, which are collected by a collector pipe placed on the bottom of the condenser, specifically on the lower end of the coil. To said collector is connected a plastic tube which drains the oil to a tank for recovery of liquid residues. The remaining vapour which has not condensed, that is the dry air resulting from the condensation, is passed through two active carbon filters placed in the filter box, so that all odours are extracted which may remain in the frying fumes, and are expelled through a grille placed on the top of the frier, where expelled fumes have been previously purified and all smells removed.

DESCRIPTION OF THE DRAWINGS

The characteristics of the invention will be understood more clearly in view of the following description, made with reference to the accompanying non-limiting drawings, where for purposes of illustration the most relevant characteristics of the invention are shown.

PREFERRED EMBODIMENT OF THE INVENTION

Figure 1:
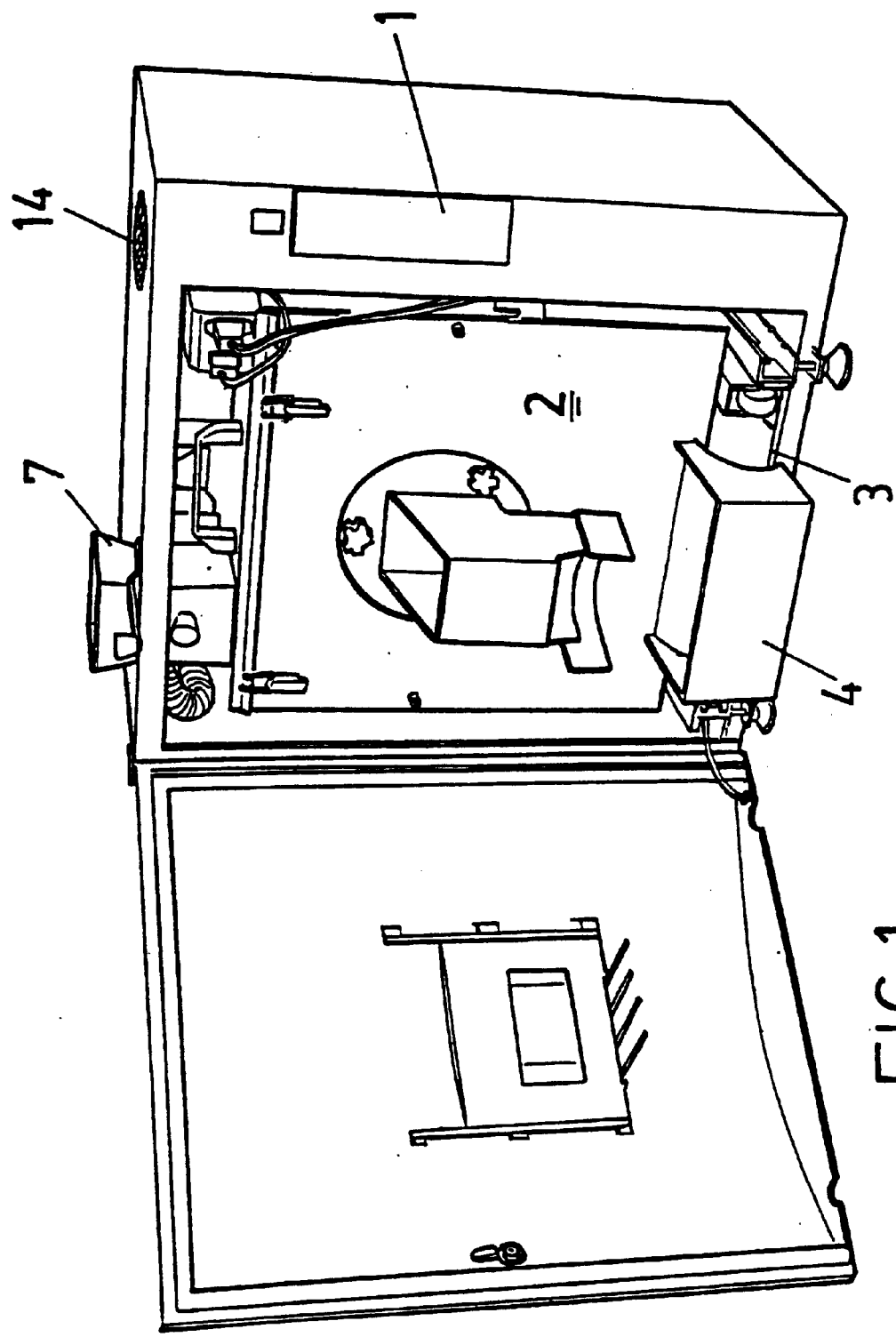
FIG. 1 shows the in side of the deep frier outer structure, showing the deep frier itself as well as the other elements.

FIG. 1 shows deep frier (2) inside an outer case, in which is the electrical board or programming panel (1). Also shown are residue caisson (4) and fried product opening (7) and it is also shown the grilles (14) through which the fumes are extracted to the outside.

Figure 2:
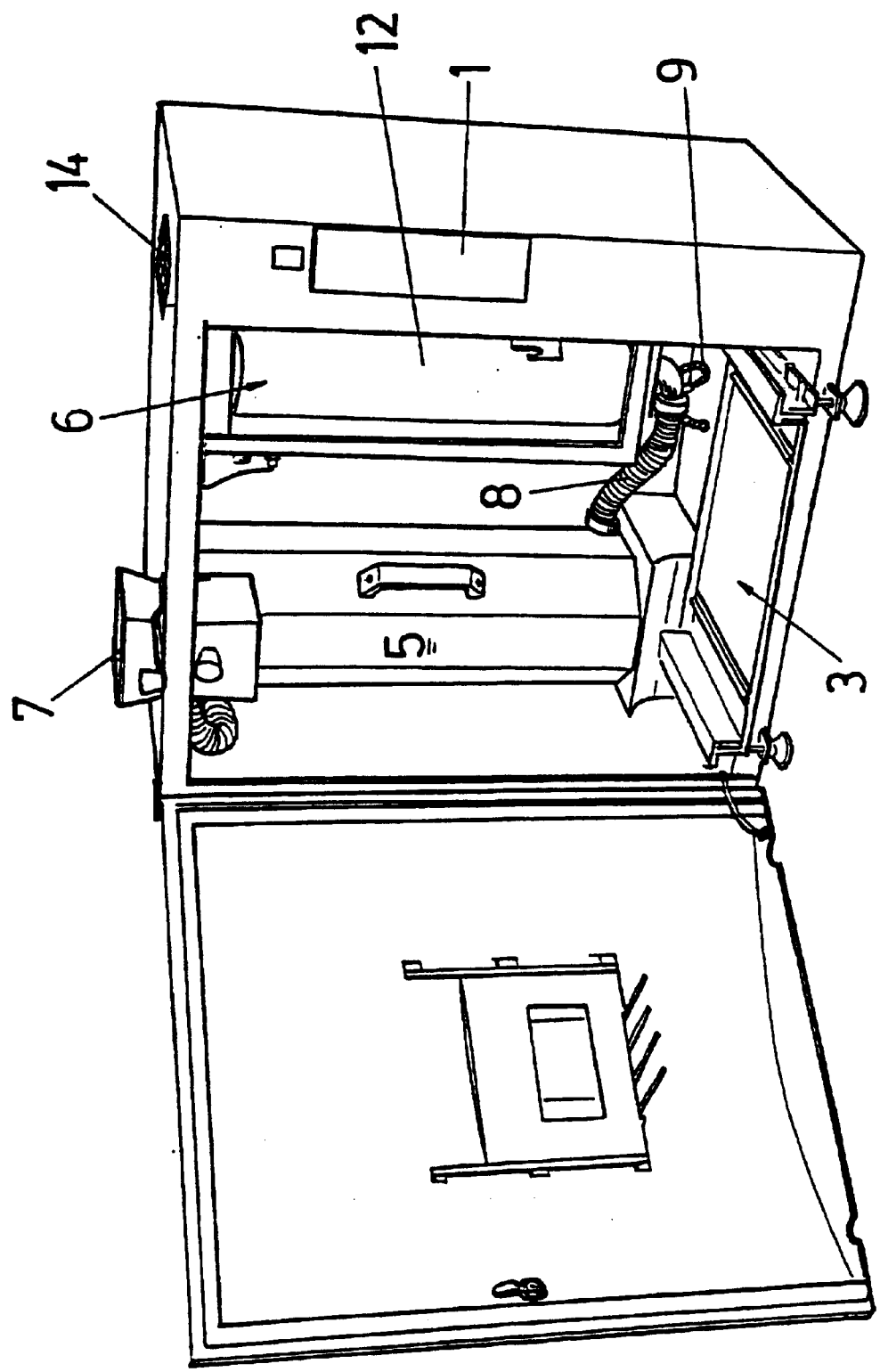
FIG. 2 shows the previous figure where the deep frier has been extracted, revealing the condenser and the filter box.

In FIG. 2 frier (2) has been extracted, revealing the set of fume condenser (5), filter box (6), collector (8), liguid residue outlet pipe (9), grille (4)for condensed and filtered fumes and extraction tray (3) of deep frier (2).

Figure 3:
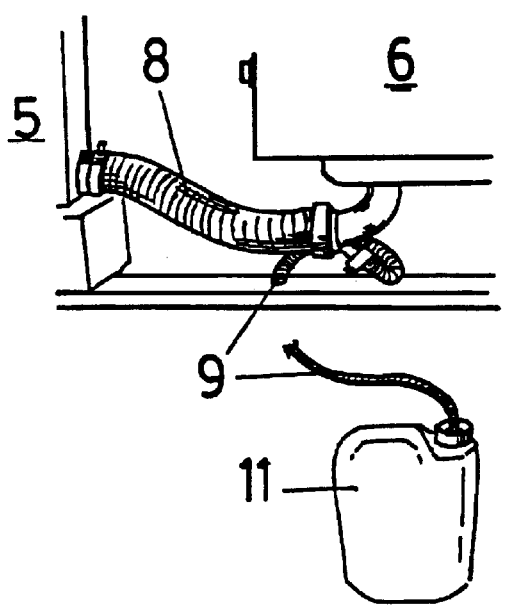
FIG. 3 shows construction details of both the condenser and the collector pipe, as well as their relative arrangement and connection.
Figure 4:
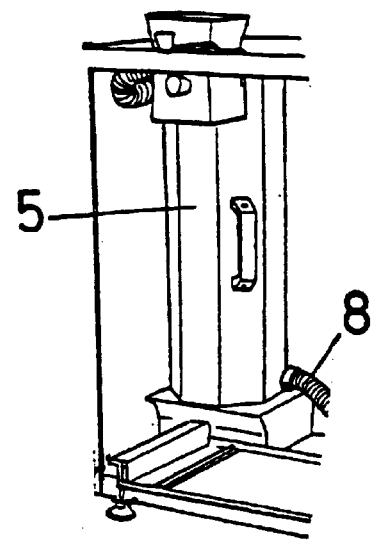
FIG. 4 shows an enlarged view of the filter box and its connection to the collector.
Figure 4:
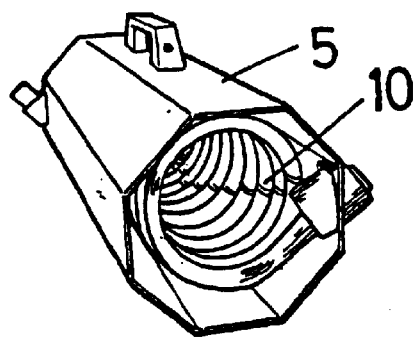
Figure 4:
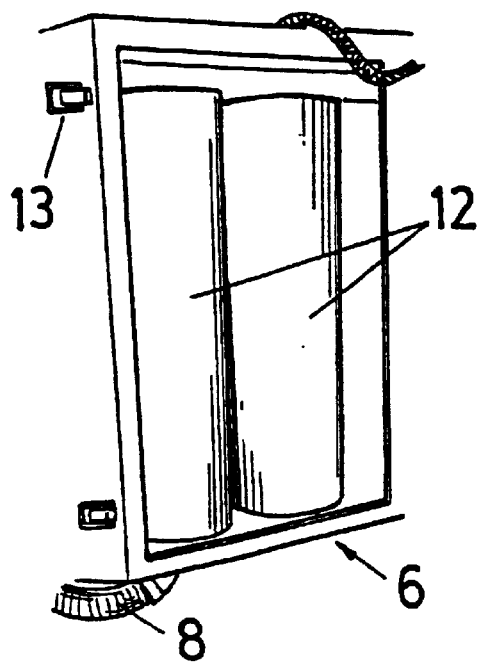

FIG. 3 shows an enlarged view of condenser (5) inside which is a stainless steel coil (10), connected on its bottom end through the walls of the condenser to collector (8), which collects condensation vapours and the water and oil remains of the frying fumes, to which collector (8) is connected a liquid residue outlet pipe (9) which connects to a collection tank (11) or any other receptacle. In turn the other end of the collector (8) is connected to filter box FIG. 4 shows the inside of filter box (6), which is provided with clamps (13) for closing the lid of filter box (6). Inside filter box (6) are two carbon filters (12) which filter the dry air resulting from the condensation, and where after passing through filters (12) the fumes are extracted to the outside through grilles (14) (FIGS. 1 and 2) located on the top of the frier structure.

This description is not extended further in the understanding that any expert in the field can understand the scope of the invention and the advantages derived thereof.

The materials, shape, size and arrangement of the elements may vary as long as the essence of the invention is unaltered.

The terms used in this memory shall be understood in a wide and non-limiting sense.

What is claimed is:

1. A semiautomatic deep frier which provides for the purification of the fumes and odors of the frying vapors prior to the expulsion thereof to the outside comprising, in addition to the elements which are necessary for frying:

a condenser having a stainless steel coil;

a collector for collecting water and oil from the frying fumes connected to said stainless steel coil and further connected to an outlet pipe ending tank for liquid residues; and a filter box having two carbon filters and a grille provided on the top thereof for extraction of condensed and purified fumes.

* * * * *